United States Patent
Hagano et al.

(10) Patent No.: US 6,978,802 B2
(45) Date of Patent: Dec. 27, 2005

(54) FUEL TANK AND MANUFACTURING METHOD THEREOF

(75) Inventors: Hiroyuki Hagano, Nishikasugai-gun (JP); Kenichiro Kaneko, Nishikasugai-gun (JP); Masayuki Nakagawa, Nishikasugai-gun (JP); Hiroshi Nishi, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 654 days.

(21) Appl. No.: 10/087,926

(22) Filed: Mar. 5, 2002

(65) Prior Publication Data

US 2002/0125254 A1   Sep. 12, 2002

(30) Foreign Application Priority Data

Mar. 8, 2001  (JP) .......................... P.2001-064929
Mar. 27, 2001 (JP) .......................... P.2001-090742

(51) Int. Cl.$^7$ ............................................. E03B 11/00
(52) U.S. Cl. ...................... 137/574; 137/560; 137/573; 137/576
(58) Field of Search ................. 137/576, 560, 137/574, 573

(56) References Cited

U.S. PATENT DOCUMENTS

| 2,980,131 | A | * | 4/1961 | Williams | ..................... 137/334 |
| 4,517,231 | A | * | 5/1985 | May et al. | ............... 428/36.92 |
| 4,951,704 | A | * | 8/1990 | Reber | .......................... 137/351 |
| 4,952,347 | A | * | 8/1990 | Kasugai | ..................... 264/457 |
| 5,326,514 | A | | 7/1994 | Linden et al. | |
| 5,394,902 | A | * | 3/1995 | Shibao | ................. 137/565.17 |
| 6,135,306 | A | | 10/2000 | Clayton et al. | |
| 6,637,457 | B2 | * | 10/2003 | Evanovich et al. | ......... 137/574 |

FOREIGN PATENT DOCUMENTS

| DE | 2440904 | 8/1974 |
| DE | 19600872 A1 | 1/1996 |
| JP | A-S60-139529 | 7/1985 |

* cited by examiner

Primary Examiner—A. Michael Chambers
(74) Attorney, Agent, or Firm—Posz Law Group, PLC

(57) ABSTRACT

In the fuel tank, a tank wall providing a tank chamber is formed by blow molding. A tank partition is disposed in the tank chamber. The tank partition is positioned in a direction substantially perpendicular to a longitudinal direction of the tank wall, and is clamped between the opposite inner surfaces of the tank wall. A functional component is attached to the tank partition.

21 Claims, 16 Drawing Sheets

FUEL TANK AND MANUFACTURING METHOD THEREOF

BACKGROUND OF THE INVENTION

1. Field of the Invention

The present invention relates to fuel tank for an automobile or the like as well as manufacturing method thereof. The fuel tank contains therein functional components such as a valve, a pump and the like. Particularly, the present invention relates to a fuel tank formed by blow molding, in which the function components are integrally disposed in the fuel tank.

2. Related Art

Functional components such as a fill-up regulating valve, a fuel pump, etc. are disposed in a fuel tank for an automobile. These functional components are indispensable for smoothly feeding fuel to an engine or the like.

The functional components are commonly disposed via a flange etc. from outside the fuel tank. When the functional components are disposed via the flange, however, a seal member such as an O-ring or the like need be separately attached in order to secure the airtightness or liquidtightness in the periphery of the disposition portion.

To solve the above drawback, a resin fuel tank in which the functional components are disposed on the inner wall side of the fuel tank without using any flange is presented.

Japanese Unexamined Patent Publication JP 01-301227 has conventionally been known as such a kind of fuel tank. The fuel tank has substantially the shape of a rectangular parallelepiped, which is formed by upper and lower walls of substantially rectangular shape and a side wall provided therebetween and surrounding the upper and lower walls. A synthetic resin plate is fixedly held in the fuel tank so as to be clamped by the inner peripheral surface of the side wall. An outer wall constituting the upper, lower, and side walls is formed by blow molding. Functional components such as a cutoff valve, a pump unit, etc. are attached to the synthetic resin plate.

FIG. 19 shows a sectional view of such a fuel tank 208. A tank body 207 has a hollow rectangular parallelepiped shape. Also, the tank body 207 is made of resin by blow molding. A plate-like module 203 is configured by a resin base body 209 and the functional components 200 disposed on the base body 209. The module 203 is bridgingly disposed between the mutually opposite inner wall side surfaces of the tank body 207.

Conventionally, the functional components 200 are integrally disposed in the plate-like module 203, and the plate-like module 203 is bridgingly disposed in the tank body 207. Thus, the functional components are disposed on the inner wall side of the fuel tank.

In the fuel tank, after the functional components are pre-assembled to the synthetic resin plate, the tank wall is formed by blow molding. Hence, a tank opening can be made small, thus enabling improvement in assembly operation properties through the tank opening.

In the conventional fuel tank, it has been required to increase mechanical strength of the tank wall and enhance safety at the time of collision to protect the functional components. Also, it has been required to decrease a change in tank capacity due to tank internal pressure and improve accuracy of a system for sensing a change in tank internal pressure and flow rate.

However, in the above conventional fuel tank, vertical rigidity of the fuel tank cannot be reinforced. That is, according to the above conventional fuel tank 208, the plate-like module 203 is disposed so as to be bridged between the mutually opposite inner wall side surfaces of the tank body 207. Consequently, although the horizontal rigidity of the fuel tank 208 can be reinforced, the vertical rigidity thereof cannot be reinforced. Since the plate-like module 203 is suspended in air in the tank body 207, the plate-like module 203 flexes under its own dead weight, and there is even a possibility that the vertical rigidity rather decreases.

SUMMARY OF THE INVENTION

The fuel tank and manufacturing method of the invention have been completed in view of the above problems. That is, the object of the invention is to provide a fuel tank which has high rigidity in vertical direction and a small change in capacity due to tank internal pressure as well as a simple manufacturing method thereof.

(1) To solve the above problems, in the present invention, there is provided a fuel tank comprising a tank wall forming a tank body; a support member formed within the tank body; functional components which are integrally disposed with the support member inside said tank body, wherein the support member is clamped between upper and lower inner surfaces of the tank wall in order to enhance vertical rigidity of the fuel tank.

(2) More specifically, the present invention may be described as follows.

The fuel tank formed by blow molding, is characterized by including a tank wall which is blow-molded of resin to form a tank chamber, at least one tank partition which is disposed in the tank chamber, in a direction substantially perpendicular to a longitudinal direction of the tank wall, and is clamped between the opposite inner surfaces of the tank wall, and a functional component attached to the tank partition.

According to (2), all the functional components are housed inside the tank wall, and the functional components are protected against an external force by the tank wall and a support member. Thus, safety at the time of collision can be improved.

Also, the tank wall clamps the tank partition so as to integrate, so that mechanical strength of the tank wall is increased. Hence, not only shape stability against an external force becomes large, but a change in tank capacity due to tank internal pressure can be decreased. Therefore, it is possible to improve accuracy of a system for sensing a change in tank internal pressure and flow rate. As long as shape stability of the tank wall is to be increased, tank partition is not limited to be one but a plurality of tank partitions may be disposed. Further, the arrangement is made such that the end portion of the tank partition is inserted into and clamped at a recess formed in the entire periphery or a part of the tank wall. Thereby, bond strength between the tank partition and the tank wall can be further increased.

As a preferred embodiment of (2), the arrangement can be made for having a coupling member which is disposed in the tank chamber and in the longitudinal direction, and couples the tank partitions to each other. The coupling member may be formed integrally with the tank partition, or may be separately assembled or removed after blow molding.

Further, as another preferred embodiment of (2), the arrangement can be made for having a connecting unit which connects the functional components housed in the tank chamber to external through a connecting opening formed in the tank wall. As an embodiment of the connecting unit, the arrangement can be made for including: an external unit having a lid which is thermal-welded to the tank wall to thereby close up the connecting opening, and an outside pipe which penetrates the lid and is connected to external; and an internal unit having an inside pipe which is connected to the outside pipe, and an lifting mechanism which is attached to the tank partition and supports the inside pipe in a raiseable and lowerable manner.

According to the invention, as an opening formed in the tank wall, there is provided the small connecting opening only, which is sealed with the lid by thermal welding. Hence, fuel permeability resistance can be increased. Further, the functional components can be connected to external by a simple operation.

(3) A method of manufacturing the fuel tank according to the invention is characterized by including a step of assembling the tank partition with the coupling member to form the support member, a step of attaching the functional component to the tank partition, a step of setting one end of the support member in a blow molding machine, a step of covering an assembled body with a parison, a step of mold-clamping a mold and molding the tank wall by force-feeding gas into the parison, and a step of sealing an opening portion of the parison.

According to the above, in the fuel tank, the functional components are pre-attached to the support member, and the tank wall is then formed by blow molding. Hence, there is no need for carrying out any burdensome operations to form a large opening in the tank wall and attach the functional components through the opening.

As a step of sealing the opening portion of the parison, a method can be taken for setting the mold so as to surround the opening portion of the parison and injecting molten resin into a cavity of the mold to thereby seal the opening portion of the parison. Also, a method may be taken for adhering with adhesive a cap for closing the opening portion of the parison.

As a preferred embodiment of (3), there are further included a step of forming a connecting opening in the upper wall of the tank wall, a step of pulling up the internal unit supported by the lifting mechanism, a step of connecting the outside pipe of the external unit to the inside pipe of the internal unit through the connecting opening, and a step of welding the lid to the tank wall to close up the connecting opening.

According to this embodiment, the functional components can be connected to external by a simple operation.

(4) To solve the above problems, another fuel tank according to the present invention, in the fuel tank comprising a tank body which stores fuel therein and a module which is fixed to the inside of the tank body and in which functional components such as a valve, a pump, etc. are integrally disposed, is characterized in that the module is a columnar module which is upstandingly disposed between the upper and lower inner surfaces of the tank body in order to enhance vertical rigidity of the fuel tank.

That is, in the fuel tank of (4), the module in which the functional components are disposed is formed into the columnar module. The columnar module is columnarly disposed between the upper and lower inner surfaces of the tank body which constitutes an outer shell of the fuel tank. The columnar module plays a role just like a column, thereby suppressing vertical strain of the fuel tank, that is, reinforcing vertical rigidity of the fuel tank.

The columnar module sets no particular limits to its shape if only the functional components can be disposed therein. For example, it can have an angular-tubular shape, an cylindrical shape, or the like. It is preferably arranged that the columnar module is of cylindrical shape.

According to this arrangement, the outer surface of the columnar module provides a peripheral surface having no angular portion. Consequently, fuel flow in the fuel tank will not be hindered by the columnar module.

At the upper and lower ends of the columnar module, there may also be provided a mechanism which strengthens the bond between the columnar module and the tank body. The columnar module is preferably arranged to have at the upper and lower ends thereof slip-off prevention ribs which are embedded in the upper and lower inner surfaces of the tank body to prevent the columnar module from slipping off the upper and lower inner surfaces.

That is, in this arrangement, the slip-off prevention ribs are disposed at the upper and lower ends of the columnar module. The slip-off prevention ribs are embedded in the upper and lower inner surfaces of the tank body. When tensile stresses are applied to the tank body from the vertical directions, the slip-off prevention ribs have a role of preventing the columnar module from being drawn out. Consequently, the slip-off prevention ribs need only extend out in a radial direction of the columnar module in spite of whether in an inner or outer peripheral direction. Also, the slip-off prevention rib sets no particular limits to its shape. Further, the slip-off prevention rib need not necessarily be disposed throughout the entire periphery of each of the upper and lower ends of the columnar module. The slip-off prevention ribs may be spacedly disposed at intervals of a certain angle such, for example, as 90 degrees or 60 degrees.

Also, wiring which is necessary for driving the functional components sets no particular limits to its disposition place. The columnar module is preferably arranged to have on the outer peripheral surface thereof a pipe-like extending tube in which the wiring of the functional components is housed and which extends outside the tank body.

That is, in this arrangement, the extending tube is disposed on the outer peripheral surface of the columnar module. The extending tube extends outside the tank body from the outer peripheral surface of the columnar module. The wiring of the functional components is disposed on the inner periphery side of the extending tube. That is, the extending tube has a role of leading the wiring of the functional components to the outside of the tank body while protecting it. The extending tube sets no particular limits to its length, diameter, etc. Also, a raw material of the extending tube need only be a material insoluble in fuel. Further, for example, the extending tube need only be extended outside from a filler neck pipe of the tank body. Thereby, there is no communicating portion with the outside except the filler neck pipe, thus having a good fuel permeability resistance.

According to this arrangement, it is possible to provide the fuel tank which is resistant to not only vertical compression stress but also tensile stress. According to this arrangement, it is also possible to provide the fuel tank which can protect the wiring of the functional components.

(5) Also, to solve the above problems, another manufacturing method of a fuel tank of the invention, in the manufacturing method of the fuel tank having thereinside a module in which functional components such as a valve, a pump, etc. are integrally disposed, is characterized by including a columnar module production step of fixing the functional components to a resin base body to produce the columnar module, a columnar module disposition step of disposing the columnar module on the inner periphery side of a tube-like parison formed out of resin in semi-melted state in such a manner that an axial direction (namely, a longitudinal direction) of the columnar module is made substantially parallel to a diametrical direction of the parison, a columnar module clamping step of clamping the parison from the outer periphery side thereof and both axial sides of the columnar module and clamping both axial ends of the columnar module onto the inner peripheral surface of the parison, and a tank body forming step of blowing the parison which thereby is press-spread along a container mold and then cooling the parison to form the tank body of the fuel tank.

The resin fuel tank is commonly produced by blow molding. Blow molding is the following molding method. That is, first, there is produced a tube-like intermediate molding body called the "parison" in a semi-melted state. Next, the container mold is disposed on the outer periphery side of the parison, and the mold is closed. Finally, air or the like is blown in from the inner periphery side of the parison after mold closing. Thereby, the parison is blown up like a balloon along the mold, thus obtaining a molding body.

In the above manufacturing method, the steps of disposing and clamping the columnar module are included in a series of steps of such blow molding. Thus, forming of tank body is carries out in synchronism with clamping of the columnar module. Specifically, the columnar module is inserted inside the inner periphery of the parison at a stage before mold closing. Then, the columnar module is clamped onto the inner peripheral surface of the parison by a pressure of the container mold at the time of mold closing.

Here, resin forming the base body of the columnar module and resin forming the parison (tank body) preferably have good welding properties. For example, as in forming the columnar module and the parison out of the same kind of resin, if the welding properties are good, when the columnar module is clamped by the parison, a welding effect as well as a clamping effect can be obtained. Consequently, bond strength between the molded tank body and columnar module can be increased.

Also, the radially extending slip-off prevention ribs are provided at the upper and lower ends of the columnar module, and these slip-off prevention ribs are embedded in the inner wall of the parison. Thereby, the bond strength can be increased even if the resin forming the base body of the columnar module and the resin forming the parison (tank body) have bad welding properties.

According to the above manufacturing method, the columnar module can be easily clamped without hindering a flow of steps of blow molding, rather by making good use of the characteristics of blow molding, i.e., using the parison in a semi-melted state.

BRIEF DESCRIPTION OF THE DRAWINGS

FIG. 6 is an explanatory view illustrating the vicinity of a fitting portion 62b of a molding surface 62a;

DETAILED DESCRIPTION OF THE PREFERRED EMBODIMENTS

Preferred embodiments of the invention will be described below to further clarify the above-described arrangement and action of the invention.

Figure 1:
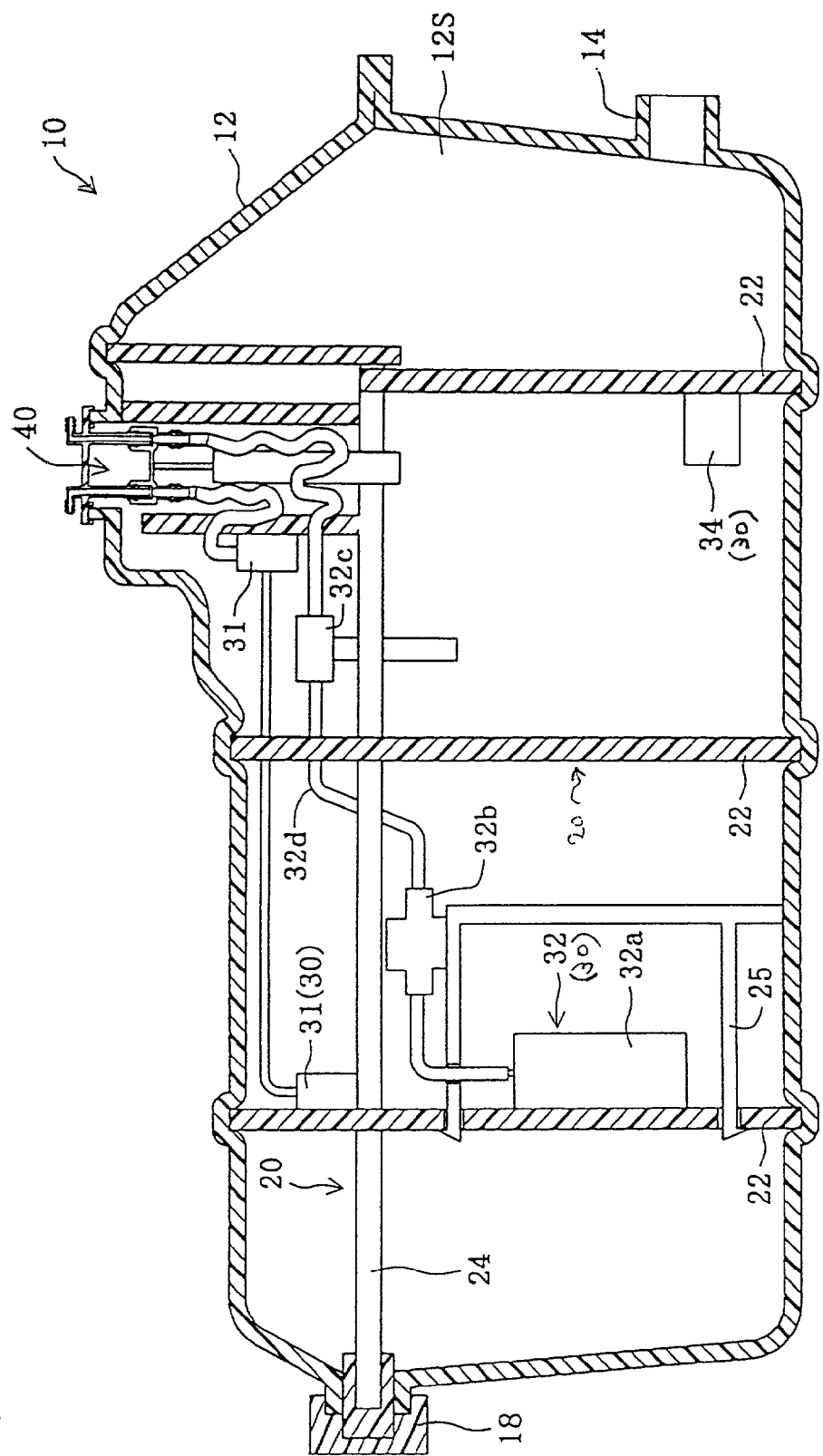
FIG. 1 is a sectional view showing a first fuel tank 10 for an automobile according to an embodiment of the invention.

FIG. 1 is a sectional view showing a first fuel tank 10 for an automobile according to an embodiment of the invention. In FIG. 1, the fuel tank 10 has the tank wall 12 which is formed by blow molding and forms the tank chamber 12S, the support member 20 for supporting the tank wall 12, the functional components 30 attached to the support member 20, and the connecting unit 40 for connecting the functional components 30 to external.

The tank wall 12, integrally molded by blow molding, is formed by stacking resin layers such as of polyethylene or the like. A connecting pipe 14 to be connected with an inlet filler pipe (not shown) projects from a side portion of the tank wall 12.

Figure 2:
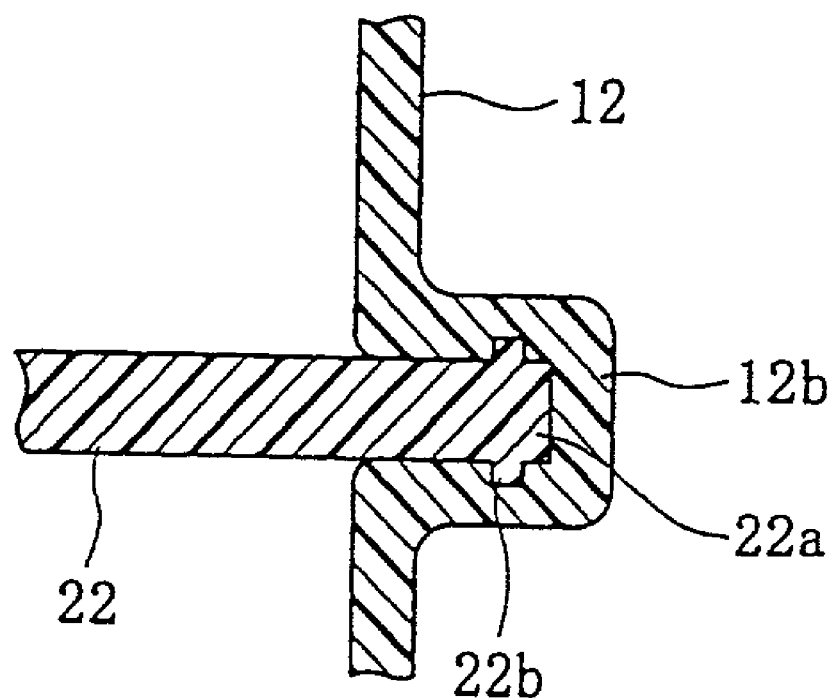
FIG. 2 is a sectional view showing a connecting place in which the end portion 22a of a tank partition 22 is connected to a tank wall 12.

The support member 20 has tank partitions 22 and a coupling member 24. The tank partitions 22 are disposed substantially perpendicular to a longitudinal direction of the tank wall 12 and substantially parallel to each other. Also, the tank partitions 22 are each clamped integrally between the opposite inner surfaces of the tank wall 12. FIG. 2 is a sectional view showing a connecting place in which the end portion 22a of the tank partition 22 is connected to the tank wall 12. As shown in FIG. 2, the end portion 22a of the tank partition 22 is clamped by a fitting portion 12b of the tank wall 12. That is, the fitting portion 12b is formed into a recess along the contour of the end portion 22a of the tank partition 22, and provided in each of the upper and lower walls of the tank wall 12. Thus, the fitting portion 12b is arranged such that the end portion 22a of the tank partition 22 is thrust into and clamped by the recess. Also, the end portion 22a of the tank partition 22 has a plurality of ribs 22b projectingly formed thereon in a direction perpendicular to the tank partition 22, thus allowing the ribs 22b to thrust in the tank wall 12.

Thus, the end portion 22a of the tank partition 22 is clamped to the tank wall 12 at the fitting portion 12b. Also, the ribs 22b are thrust into the tank wall 12, thereby resulting in an increase in bond strength. Here, the tank partition 22 preferably uses, as its material, resin e.g. polyethylene which is welded to the tank wall 12. Thereby, the tank partition 22 is welded to the tank wall 12, thus providing better bond strength. The tank partition 22 serves as a reinforcing member for preventing deformation of the tank wall 12. Also, the coupling member 24 penetrates and couples the plurality of tank partitions 22, thereby assembling the tank partitions 22 integrally in the tank wall 12. A frame body 25 for attaching the functional components 30 is attached to the tank partition 22 on the left-hand side of the figure.

The functional components 30 are attached to the tank partition 22 thereby to be housed inside the tank wall 12. The functional components 30 are parts which are disposed in a common fuel tank, including for example a fuel cutoff valve 31, a pump module 32, a pressure sensor 34, etc.

Two fuel cutoff valves 31 are attached to the upper portion of the tank partition 22. They are the valves which let fuel vapor in the fuel tank escape to a canister and prevent liquid fuel from flowing outside.

The pump module 32 is a device for feeding fuel to external, and has a fuel pump 32a, a filter 32b, and a pressure regulator 32c, which are connected by a tube 32d. The fuel pump 32a and the filter 32b are attached to the frame body 25.

Figure 3:
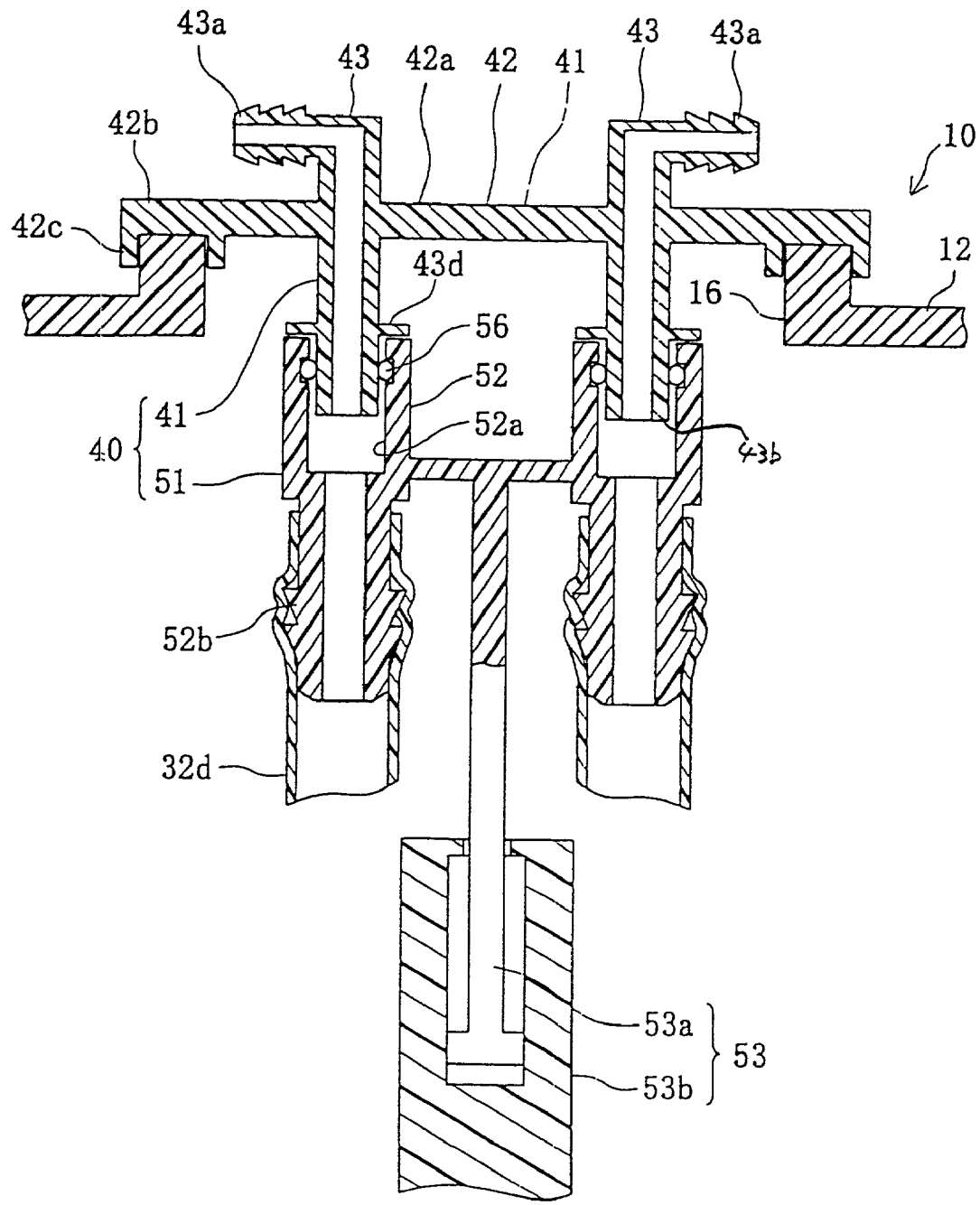
FIG. 3 is a sectional view showing the periphery of a connecting unit 40.

FIG. 3 is a sectional view showing the periphery of the connecting unit 40. In FIG. 3, the connecting unit 40 has the external unit 41 and the internal unit 51 to be connected to the functional components 30.

The external unit 41 has a lid 42 which is thermal-welded to the tank wall 12 to thereby close up a connecting opening 16 formed in the tank wall 12. That is, the lid 42 is formed out of polyethylene which is the same resin material as that of the fuel tank 10. Also, the lid 42 has a lid main body 42a, a flange 42b in the outer periphery of the lid main body 42a, and a thermal welding end 42c at the lower end of the flange 42b. Outside pipes 43, 43 penetrate the lid main body 42a. A nipple 43a is formed outside the outside pipe 43, while a connecting end 43b is formed inside the outside pipe 43. A stopper 43d is projectingly formed at the upper portion of the connecting end 43b.

The internal unit 51 has inside pipes 52, 52 and an lifting mechanism 53 for raising and lowering inside pipes 52, 52. The lifting mechanism 53 has an lifting member 53a for connecting and raising and lowering the inside pipes 52, 52, and a cylinder 53b for supporting the lifting member 53a and regulating its vertical displacement.

The inside pipe 52 has an inserting port 52a. The inside pipe 52 is connected to the outside pipe 43 by inserting the connecting end 43b of the outside pipe 43 into the inserting port 52a. Further, in the inserting port 52a there is disposed a seal member 56 for providing a seal between the inside pipe 52 and the outside pipe 43. The other end of the inside pipe 52 is formed into a nipple 52b, to which a tube 32d is connected. The tube 32d is formed out of a spiral and flexible tube so as to enable raising and lowering the internal unit 51.

Figure 4:
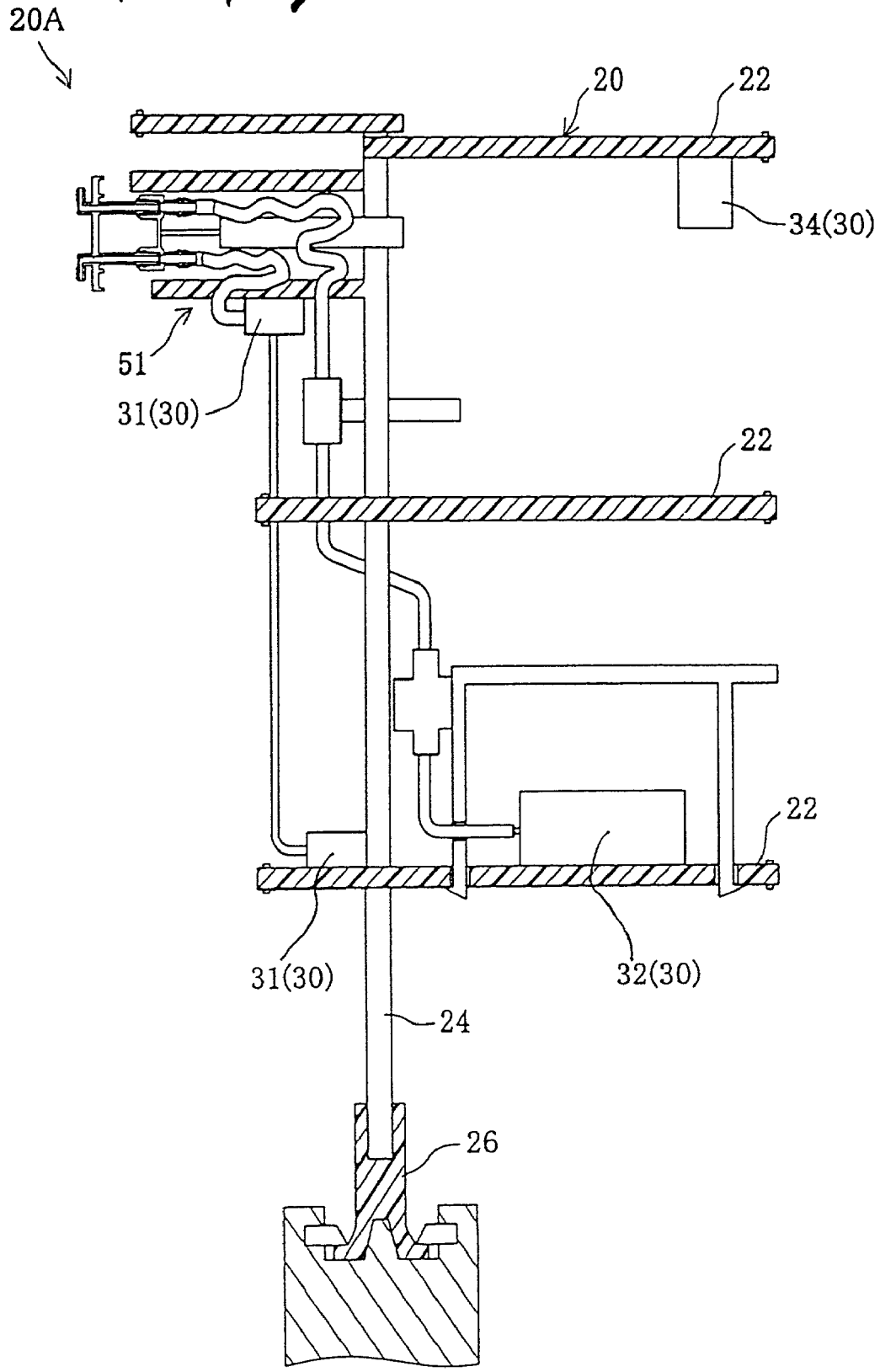
FIG. 4 is an explanatory view illustrating a state in which functional components 30 and an internal unit 51 are assembled to a support member 20.

Description will now be made of a series of steps of manufacturing the fuel tank 10. FIG. 4 is an explanatory view illustrating a state in which the functional components 30 and the internal unit 51 are assembled to the support member 20. In FIG. 4, by screwing or welding, the fuel cutoff valve 31, the fuel pump 32a, and the pressure sensor 34 are fixed to and the internal unit 51 is attached to the tank partition 22 of the support member 20 prefabricated by injection molding, thereby forming the assembled body 20A. Further, a flared support base 26 is pre-fixed to the end portion of the coupling member 24 of the support member 20.

Figure 5:
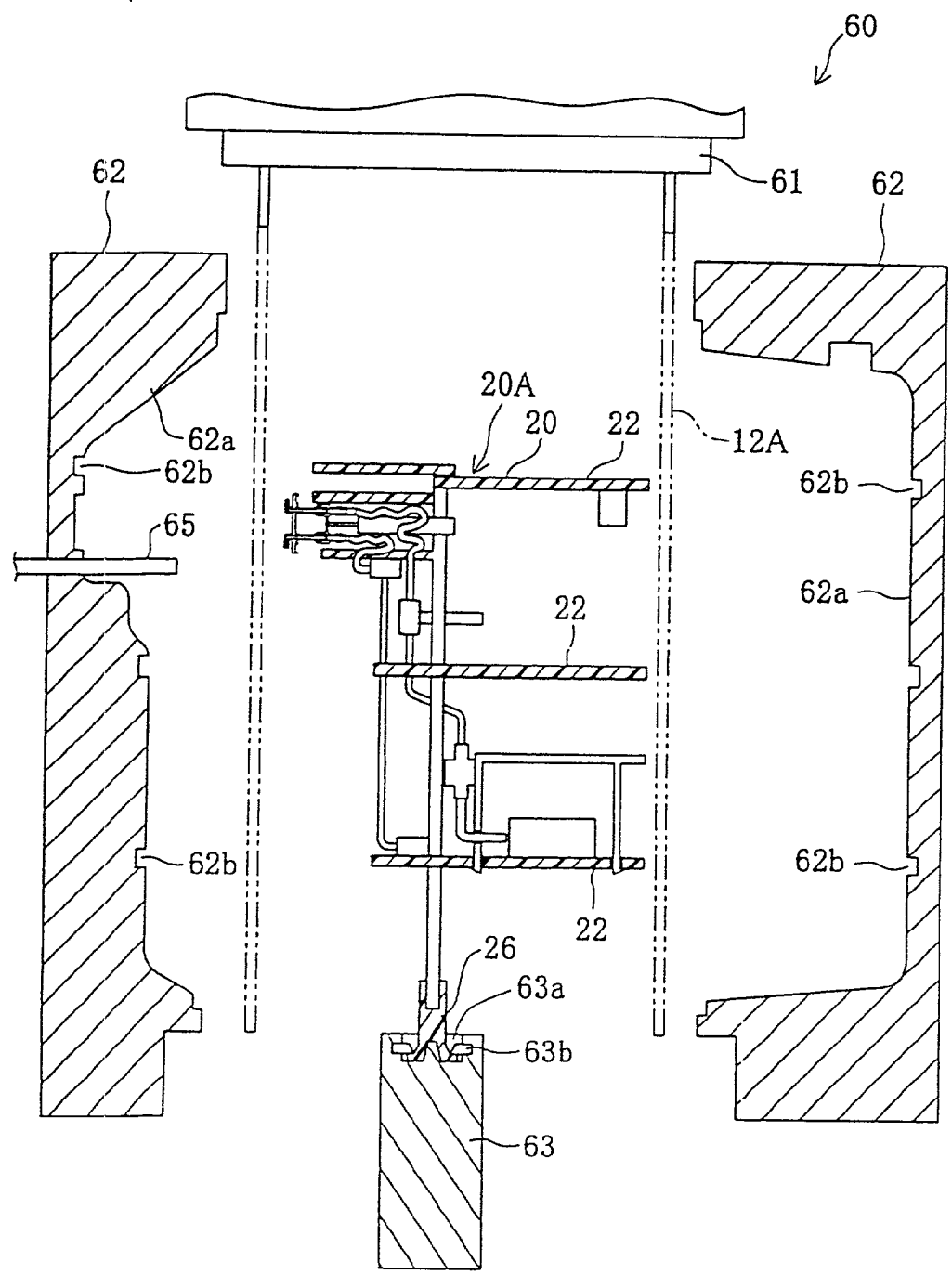
FIG. 5 is an explanatory view illustrating a mold opening state before blow molding.
Figure 6:
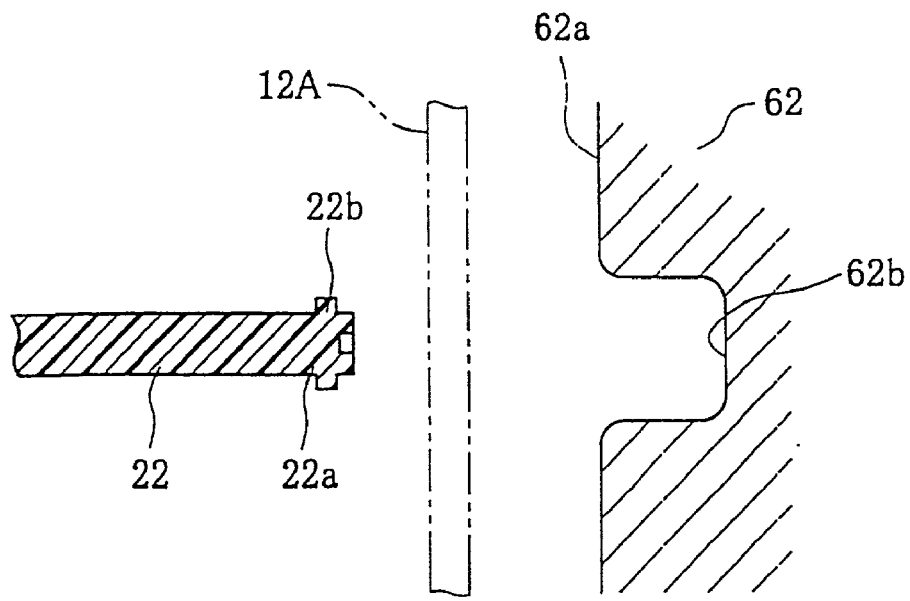

Subsequently, blow molding is carried out. FIG. 5 is an explanatory view illustrating a mold opening state before blow molding. A blow molding machine 60 has a head 61 for extruding parison 12A, molds 62, 62, and a holding jig 63. As shown in FIG. 5, the molds 62, 62 have a molding surface 62a shaped according to the tank wall 12. On the molding surface 62a, as shown in FIG. 6, a fitting groove 62b is formed along a position corresponding to the end portion 22a of the tank partition 22. The fitting groove 62b is a groove which molds the fitting portion 12b as shown in FIG. 2.

Figure 7:
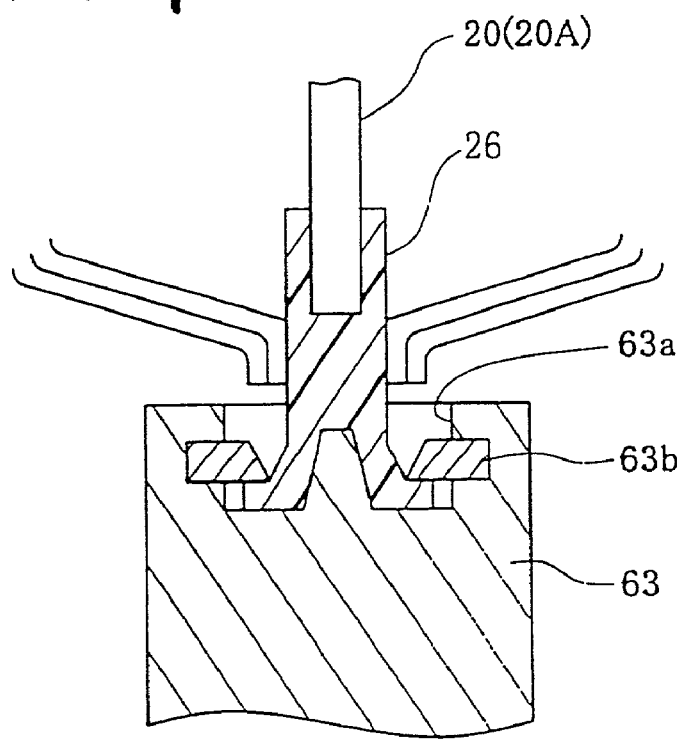
FIG. 7 is an explanatory view illustrating an arrangement in which the support member 20 is supported on a holding jig 63.

First, the support base 26 of the support member 20 is set in the holding jig 63. That is, as shown in FIG. 7, the support base 26 is inserted into a support hole 63a of the holding jig 63, and is fixed with a fixing slider 63b, thereby supporting the assembled body 20A in upright condition.

Then, the cylindrical parison 12A is extruded from the head 61 of the blow molding machine 60 shown in FIG. 5, and the parison 12A is disposed in the periphery of the assembled body 20A. Thereafter, after mold clamping is carried out, an air feeding pipe 65 is inserted into the parison 12A to blow air into the parison 12A. The parison 12A is blown into the shape of the tank wall 12 after the contour of the molding surface 62a of the molds 62, 62. At this time, as shown in FIGS. 2 and 6, the parison 12A provides the fitting portion 12b by the fitting groove 62b. Then, the end portion 22a of the tank partition 22 is clamped by the fitting portion 12b, thus increasing its bond strength. When the parison 12A is formed out of a material which is mutually welded to the tank partition 22, since the parison 12A is thermal-welded at the end portion 22a of the tank partition 22, its bond strength is further increased.

Figure 8:
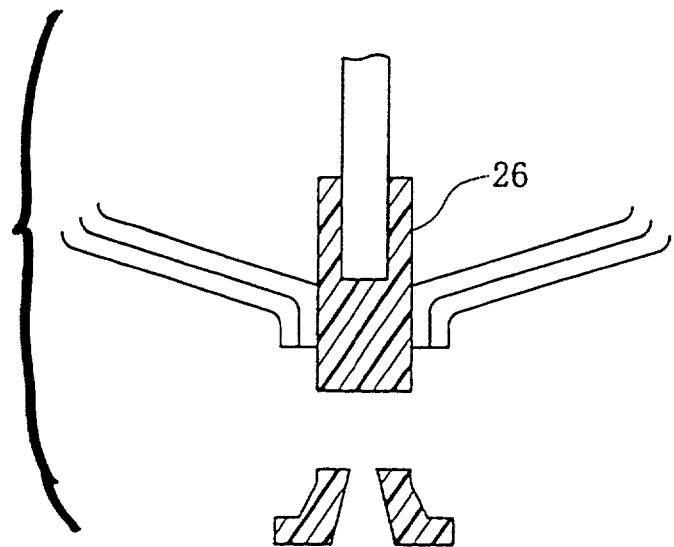
FIG. 8 is an explanatory view illustrating a terminal treatment of a support base 26.
Figure 9:
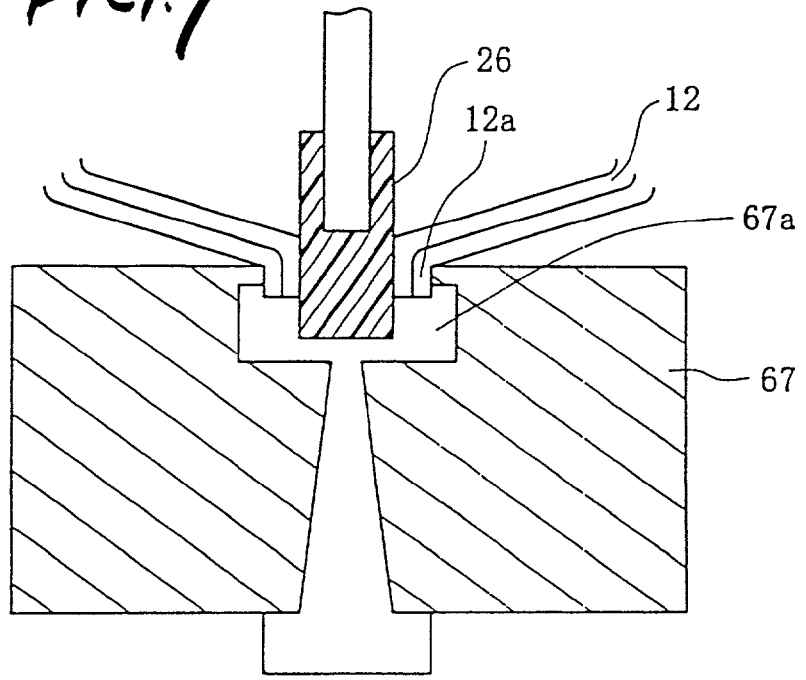
FIG. 9 is an explanatory view illustrating an operation of sealing the vicinity of a tank opening.

Subsequently, the holding jig 63 is withdrawn, and the lower end of the support base 26 is cut with a cutter as shown in FIG. 8. Next, as shown in FIG. 9, a stationary mold is moved up to the lower surface of the molds 62, 62. A cavity 67a is formed in the stationary mold 67. The support base 26 and the opening end portion 12a of the tank wall 12 are set in the cavity 67a. Then, molten resin is injected into the cavity 67a from an illustrated resin injection unit. The molten resin is cooled, and then there is formed a sealing portion (see FIG. 1) into which the support base 26 and the opening end portion 12a are integrated. Thereby, a seal is provided between the opening end portion 12a and the support base 26. Thereafter, mold opening is carried out, and the fuel tank 10 is taken out.

Figure 10:
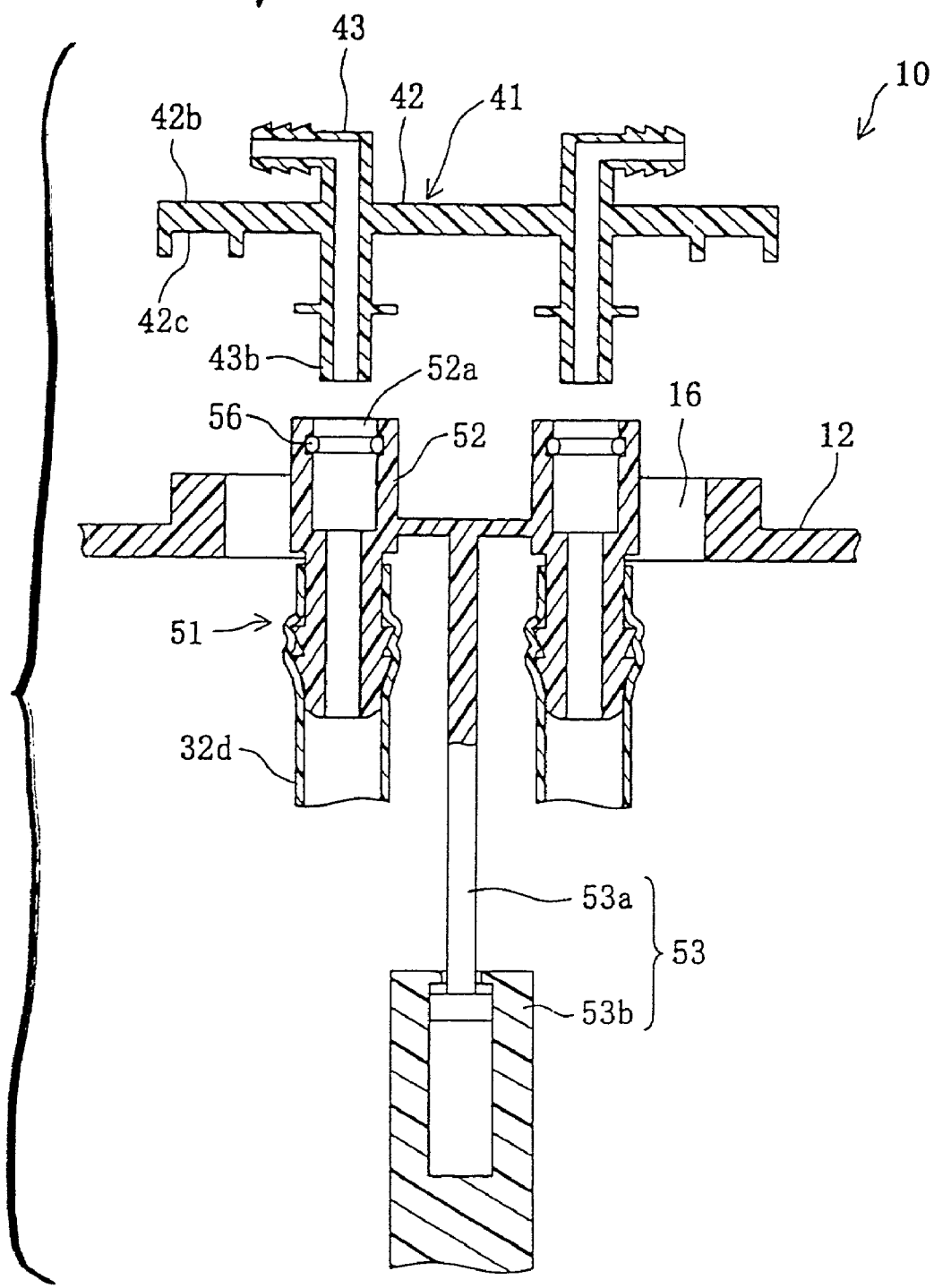
FIG. 10 is an explanatory view illustrating a connecting operation of the connecting unit 40.

Subsequently there is carried out an operation in which the functional components 30 disposed inside the tank wall 12 are connected to external. FIG. 10 is a view showing the vicinity of the upper wall of the tank wall 12. First, the connecting opening 16 is formed in the upper wall of the tank wall 12 with a cutter or the like. The connecting opening 16 is formed at a place in conformity to the position of the internal unit 51. Subsequently, the internal unit 51 is pulled up through the connecting opening 16. At this time, the internal fair unit 51 is supported by the lifting member 53*a* in a raiseable and lowerable manner, and the tubes 32*d*, 32*d* are disposed in loose condition. Hence, the internal unit 51 can be pulled outside through the connecting opening 16 with its position kept upright.

In such a condition, the external unit 41 is connected to the internal unit 51. That is, the connecting end 43*b* of the external unit 41 is inserted into the inserting port 52*a* of the internal unit 51. Since the seal member 56 is disposed in the inserting port 52*a*, a seal is provided with respect to the connecting end 43*b*. Thereafter, the thermal welding end 42*c* of the flange 42*b* of the lid 42 is melted by a heating plate (not shown) and welded to the tank wall 12. Then, the fuel tank 10 is completed through a step of attaching an inlet pipe etc. to the connecting pipe 14 (see FIG. 1) and the like step.

The following advantages can be obtained according to the above fuel tank 10.

(1) In the fuel tank 10, the functional components 30 are pre-attached to the support member 20, and the tank wall 12 is then formed by blow molding. Hence, there is no need for carrying out any burdensome operations of forming a large opening in the tank wall 12 and attaching the functional components through the opening.

(2) As an opening formed in the tank wall 12, there is provided the small connecting opening 16 only, which is sealed with the lid 42 by thermal welding. Hence, fuel permeability resistance can be increased.

(3) All the functional components 30 are housed inside the tank wall 12 and protected against an external force by the tank wall 12 and the support member 20. Thus, safety at the time of collision can be increased.

(4) The tank wall 12 is clamped by and integrated into the tank partition 22, which structure is large in mechanical strength. Thus, not only shape stability against an external force becomes large, but a change in tank capacity due to tank internal pressure can be decreased. Therefore, it is possible to improve accuracy of a system for sensing a change in tank internal pressure and flow rate.

The invention is not limited to the above embodiment, but may be embodied in various forms without departing from the spirit and scope thereof. For example, the following modification and variation are also possible.

In the above embodiment, the coupling member 24 for supporting the tank partition 22 is housed inside the tank wall 12. In addition, the coupling member 24 may be removed after the blow molding by which the tank wall 12 is integrated with the tank partition 22.

In the above embodiment, the tank opening is sealed by the sealing portion 18. In addition, if only it is a means for sealing the tank opening, a cap or the like may be sealed to the tank opening with adhesive or the like.

Figure 11:
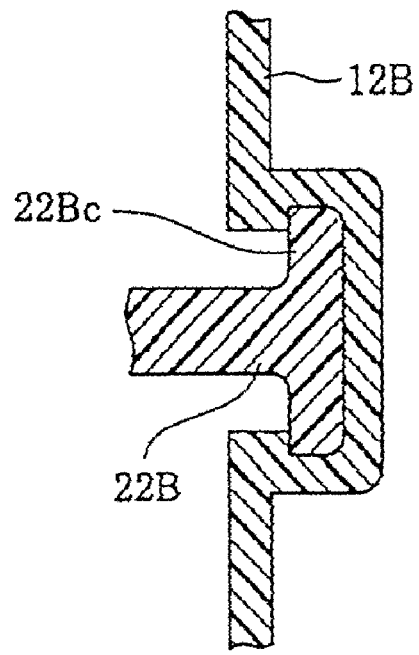
FIG. 11 is a sectional view showing a connecting place of the tank partition 22B and the tank wall 12B according to a modification of the first fuel tank.
Figure 12:
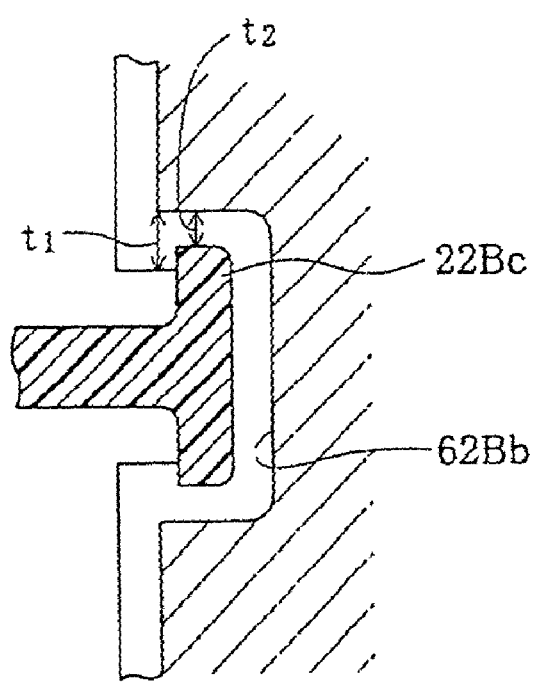
FIG. 12 is an explanatory view illustrating an operation of the modification shown in FIG. 11.

FIG. 11 is an explanatory view illustrating a connecting place in which the end portion of the tank partition 22B and the tank wall 12B according to a modification of the invention are connected to each other. In FIG. 11, the flange 22Bc is formed at the end portion of the tank partition 22B. The flange 22Bc contributes to prevention of displacement between the tank partition 22B and the tank wall 12B, and to an increase in adhesive area of the tank partition wall 22B to the tank wall 12B. The flange 22Bc also contributes to improvement in mechanical strength and pressure tightness accompanied by dispersion of stresses on the tank wall 12B. In this case, as shown in FIG. 12, when the tank wall 12B gets into the fitting groove 62Bb, the wall thickness t2 on the side portion of the flange 22Bc is made thinner than any other wall thickness t1, which serves the function of preventing the flange 22Bc from slipping out. Accordingly, the bond strength is further increased.

The portion at which the end portion of the tank partition is fitted in the fitting portion of the tank wall is not limited to the upper and lower walls of the tank wall, but can be provided in various ranges in consideration of the mechanical strength and manufacturing properties of the tank wall.

Description will hereinafter be made of a second fuel tank and a manufacturing method thereof.

Figure 13:
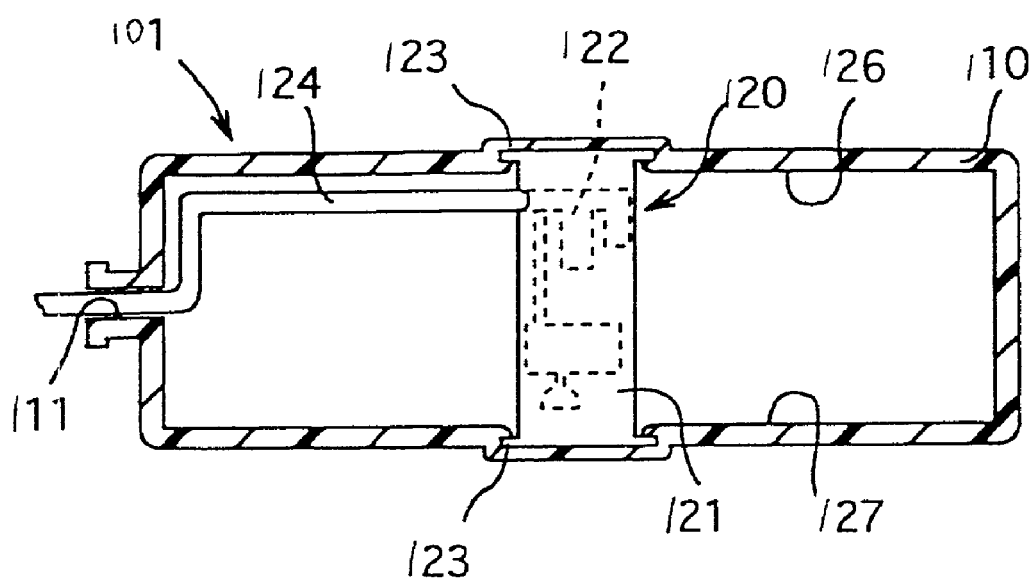
FIG. 13 is a sectional view of a second fuel tank of the invention.

FIG. 13 shows a sectional view of the fuel tank of the embodiment. As shown in FIG. 13, the fuel tank 101 consists of a tank body 110 and a columnar module 120, which serves as a support member of the invention.

The tank body 110 has a laterally wide hollow rectangular parallelepiped shape. A round filler-neck-pipe hole 111 is formed in the side wall of the tank body 110.

Meanwhile, the columnar module 120 has a cylindrical shape. The columnar module 120 consists of a base body 121 made of high-density polyethylene (HDPE) and functional components 122 (a portion as indicated by dotted lines in FIG. 13) fixed to the base body 121. The columnar module 120 is upstandingly disposed between an upper surface 126 and a lower surface 127 of inner wall of the tank body 110. The upper end of the outer peripheral surface of the columnar module 120 is embedded in the upper inner surface 126, while the lower end thereof is embedded in the lower inner surface 127. Ring-like slip-off prevention ribs 123 are peripherally provided at the upper and lower ends of the columnar module 120. The slip-off prevention ribs 123 prevent the columnar module 120 from slipping off the tank body 110 when tensile stresses are applied to the tank body 110 in the vertical directions. The pipe-like extending tube 124 is connected to the outer peripheral surface top portion of the columnar module 120. The extending tube 124 extends laterally along the inner wall upper surface of the tank body 110, extends downwardly along the inner wall side surface of the tank body 110, and extends outside the tank body 110 through the filler-neck-pipe hole 111. Inside the extending tube 124, there are disposed, for example, electric wiring for taking out an electric signal from the functional components 122.

According to the embodiment, since the filler-neck-pipe hole 111 is used, as it is, as a route of the extending tube 124, a through hole or the like exclusively for the extending tube 124 need not be formed separately in the tank body 110.

In the fuel tank of the embodiment, the slip-off prevention ribs are provided at the upper and lower ends of the columnar module. Alternatively, if there is no possibility that the columnar module slips off, the invention may be embodied in the form in which the slip-off prevention ribs 123 are not provided. Also, the upper and lower ends of the columnar module are embedded in the upper and lower inner surfaces of the tank body, respectively. Alternatively, the invention may be embodied in the form in which they are not thus embedded therein.

Also, if only the disposition place of the columnar module 120 lies between the upper and lower inner surfaces of the tank body 110, no particular limits are set thereto. That is, the upper end of the columnar module 120 need only be fixed in abutment with the upper inner surface 126 of the tank body 110. Also, the lower end of the columnar module 120 need only be fixed in abutment with the lower inner surface 127 of the tank body 110.

The functional components 122 integrally disposed in the columnar module 120 include, for example, a fuel gauge sensor, a pressure regulator, a fill-up regulating valve, an overfueling prevention valve, a rollover valve, a fuel pump, etc.

The manufacturing method of the fuel tank according to the embodiment consists of the columnar module production step, the columnar module disposition step, the columnar module clamping step, and the tank body forming step.

First, the columnar module production step will be described. In this step, the columnar module is produced out of the base body and the functional components. The base body is made of HDPE and molded into a hollow cylindrical shape by injection molding. The ring-like slip-off prevention ribs are peripherally provided at the outer peripheral surface upper and lower ends of the base body. Meanwhile, an attachment seat is disposed on the inner periphery side of the base body. The functional components are fixed to the attachment seat by screwing, welding, or the like. The electric wiring or the like of the functional components is put through the stainless steel extending tube laterally extending in a crank-like manner from the outer peripheral surface upper end portion of the base body.

Figure 14:
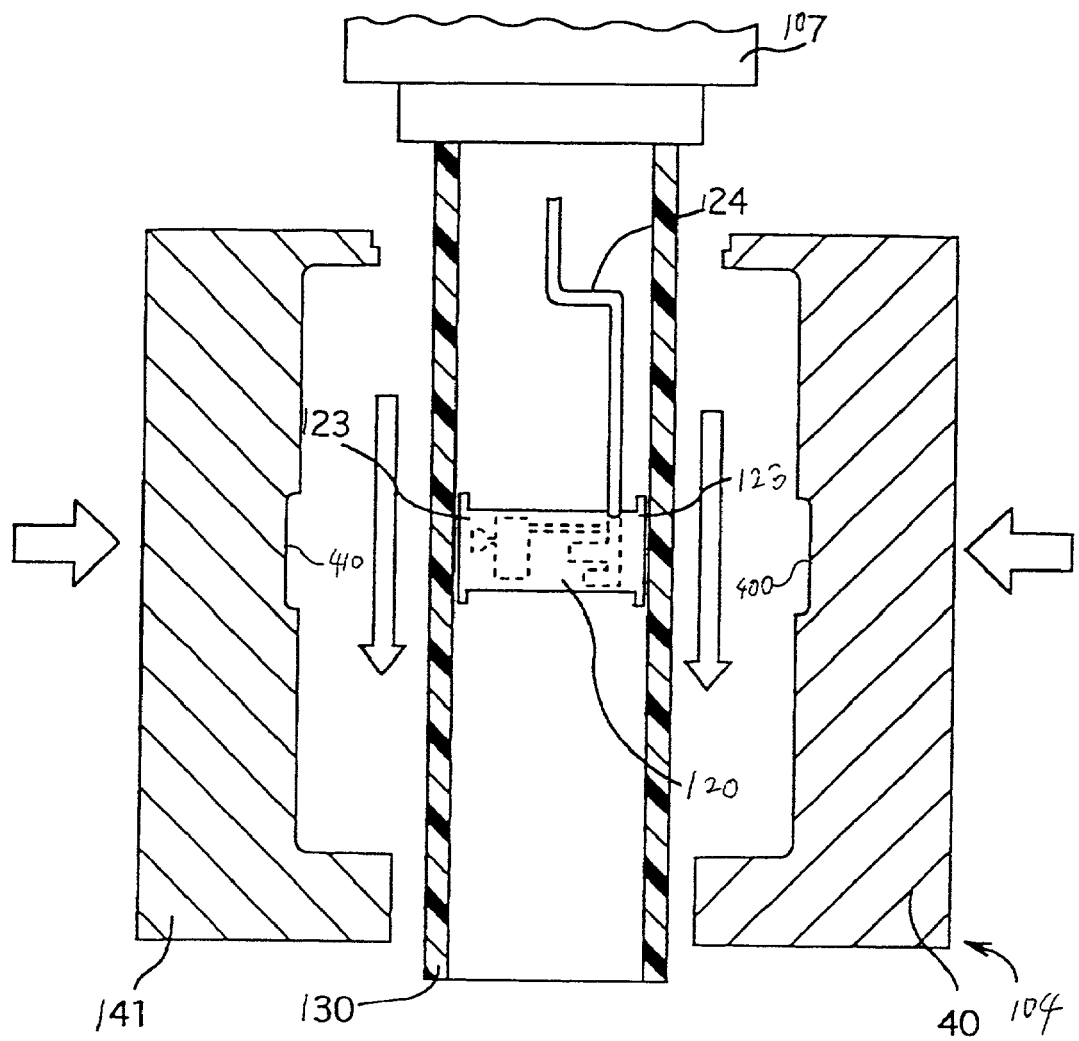
FIG. 14 is a view showing a condition in which a columnar module is disposed in a second manufacturing method of the invention.

Next, the columnar module disposition step will be described. In this step, first, as shown in FIG. 14, the columnar module is laid down and disposed below a parison molding machine 107. At this time, the columnar module 120 is suspended in air by fixing the extending tube 124 to the lower end of the parison molding machine 107 (not shown). In this step, next, the tube-like parison 130 is extruded from the parison molding machine 107. The parison 130 has a multilayer structure, and its innermost and outer layers are made of HDPE. Also, the parison 130 is in a semi-melted state. By being extruded from the parison molding machine 107, the parison 130 hangs down around the columnar module suspended in air. At this time, either end of the columnar module 120 is arranged not to make contact with the inner peripheral surface of the parison 130. Also, adjustment is made such that the crank end of the extending tube 124 is positioned just in the radial center of the parison 130.

Next, the columnar module clamping step will be described. In this step, as shown in FIG. 14, the parison 130 is clamped from sideways by a pair of rectangular-parallelepiped-shaped container molds 104 called side molds 140, 141, and then the molds are closed. This clamping direction is parallel to the axial direction, in other wards, longitudinal direction of the columnar module inside the parison 130. Recesses 400, 410 are formed in the inner walls of the side molds 140, 141, respectively. When the side molds 140, 141 are closed, both ends of the columnar module 120 are disposed in these recesses 400, 410. Then, the slip-off prevention ribs 123 at both ends of the columnar module 120 sink into the inner peripheral surface of the parison 130 in a semi-melted state. Also, the semi-melted resin in the peripheral portion of the recesses 400, 410 covers the slip-off prevention ribs 123 all around. Thus, both ends of the columnar module 120 are embedded in the inner peripheral surface of the parison 130. In this state, heat of the parison 130 is transmitted to both ends of the columnar module 120. Then, the columnar module 120 is clamped by and welded to the parison 130. When the container molds 104 are closed, an opening is formed in the upper center. The crank end of the extending tube 124 is disposed in this opening.

Figure 15:
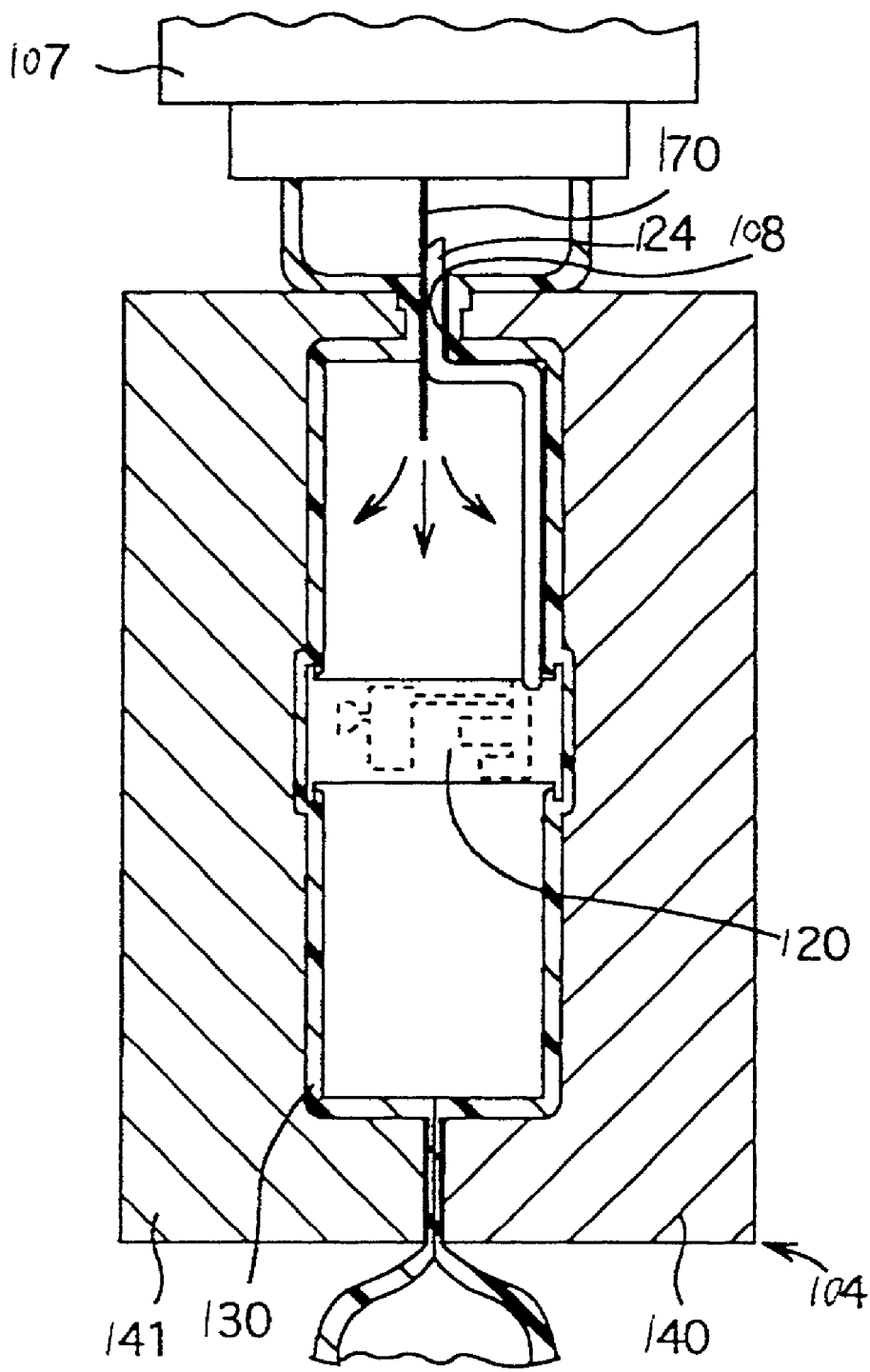
FIG. 15 is a view showing a condition in which a tank body is blow-molded in the manufacturing method of the invention.

Next, the tank body forming step will be described. In this step, as shown in FIG. 15, a blow pin 170 is inserted into the inner periphery side of the parison 130 from the opening 108 formed by mold closing, thus injecting air thereinto. Then, the parison 130 is blown into a rectangular parallelepiped shape along the cavity. At this time, the parison 130 is blown out mainly in the lateral direction (in a vertical direction of paper on which FIG. 15 is drawn). Then, the parison 130 is press-spread in every corner of the container molds 104. Thereafter, the parison 130 is cooled and solidified into the tank body. Finally, the pair of side molds 140, 141 of the container molds 104 is opened, and a flash or the like is cut off. Thus, the fuel tank having the columnar module disposed thereinside can be obtained.

In the manufacturing method of the embodiment, the base body of the columnar module is made of HDPE. Alternatively, if only there is provided the slip-off prevention structure for preventing the columnar module from slipping off the tank body, resin such for example as polyacetal (POM), polyamide (PA), or the like may be available.

Also, in the columnar module disposition step in the manufacturing method of the embodiment, the parison is hung down around the pre-disposed columnar module in such a manner that either end of the columnar module makes no connect with the inner peripheral surface of the parison. Alternatively, it may also be the other way around. That is, the columnar module may be inserted inside the hung-down parison. Also, in the columnar module disposition method, other than the method of grasping the extending tube from the parison molding machine side as in the manufacturing method of the embodiment, there is also a method by which an exclusive holding jig is provided.

Also, in the columnar module clamping step in the manufacturing method of the embodiment, molding is carried out by the pair of container molds called side molds. However, no particular limits are set to the number of the container molds. If only both ends of the columnar module can be clamped onto the inner periphery side of the parison, for example, four or six molds may also be available.

Also, in the columnar module clamping step in the manufacturing method of the embodiment, the slip-off prevention ribs at both ends of the columnar module are embedded in the inner peripheral surface of the parison. Alternatively, the invention may be embodied without embedding the slip-off prevention ribs.

Figure 16:
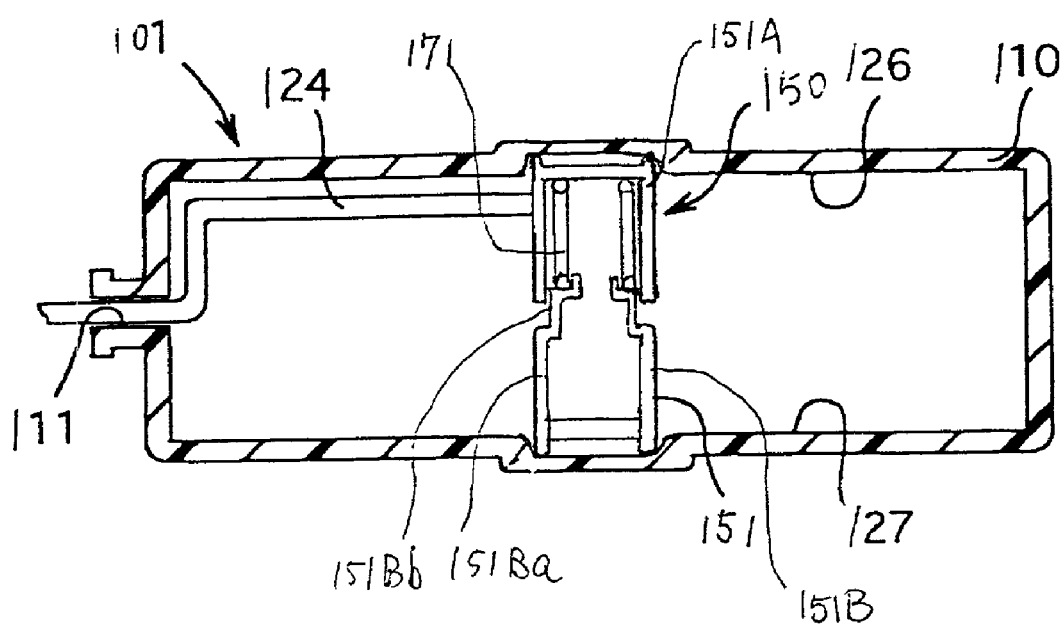
FIG. 16 is a sectional view of a modification of the second fuel tank of the invention.

A modification of the columnar module as support member of the invention is shown in FIG. 16. A columnar module 150 is provided with a first casing 151A and a second casing 151B, forming a two-piece base body 151 and an elastic member 171 (a coil spring in this embodiment). The second casing 151B has a main body portion 151Ba with an outer diameter similar to that of the first casing 151A and an insert portion 151Bb with a smaller outer diameter than that of the main body portion 151Ba. The insert portion 151Bb is inserted into the first casing 151A, so that the elastic member 171 provided within the first casing 151A abuts with the upper wall of the first casing 151A. By a resilient force of the elastic member 171, the first and second casing 151A and 151B are urged with each other in the longitudinal direction of the columnar module 150, thereby urging an upper and lower inner surface of 126, 127 of the tank body 110 at the both end of the base body 151.

By such the configuration, the columnar module 150 keep urging the upper and lower inner surface 126, 127 after the molding of the tank body 110 and the clamping effect of the columnar module is enhanced.

Figure 17:
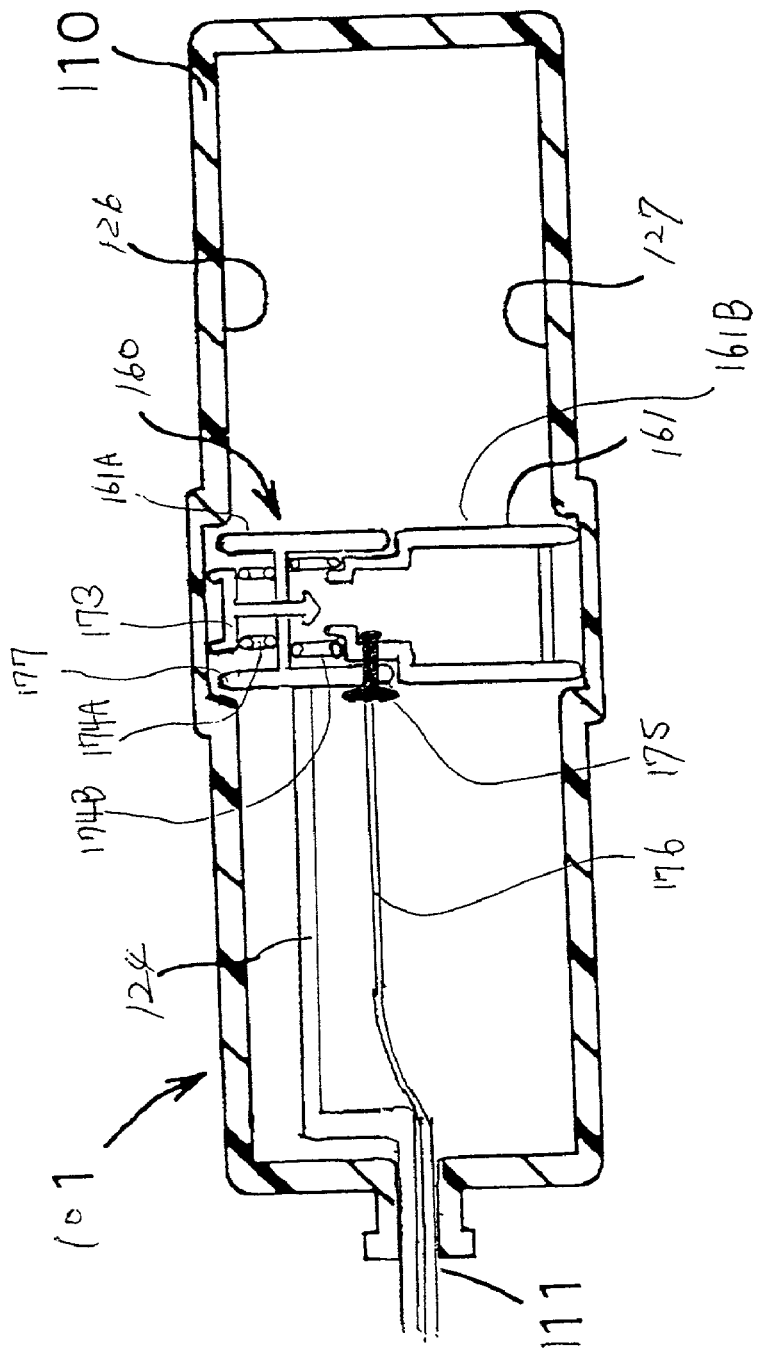
FIG. 17 is a sectional view of another modification of the second fuel tank of the invention showing a clamping operation of the support member.
Figure 18:
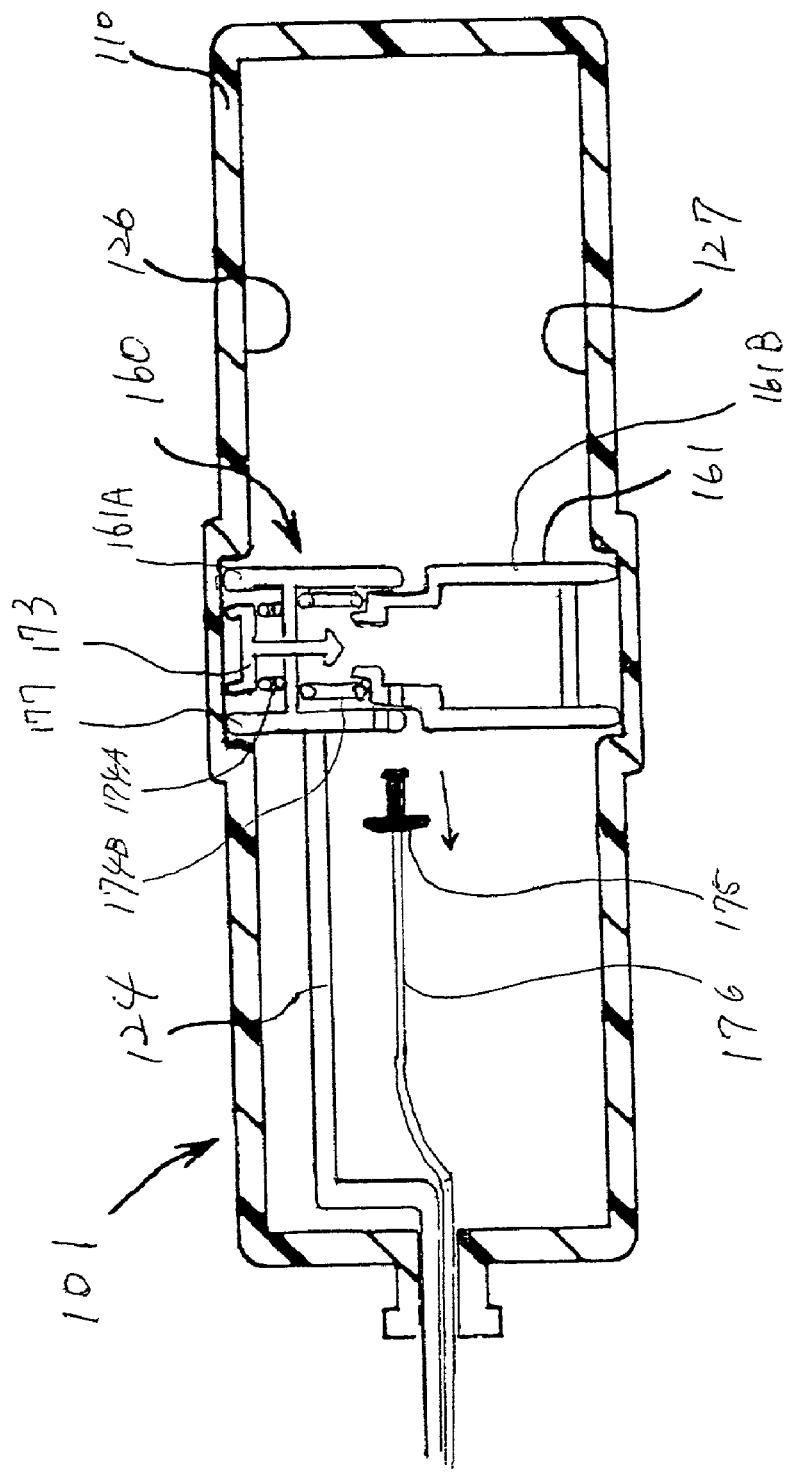
FIG. 18 is a sectional view showing the subsequent step of FIG. 17 described as another modification of the second fuel tank.
Figure 19:
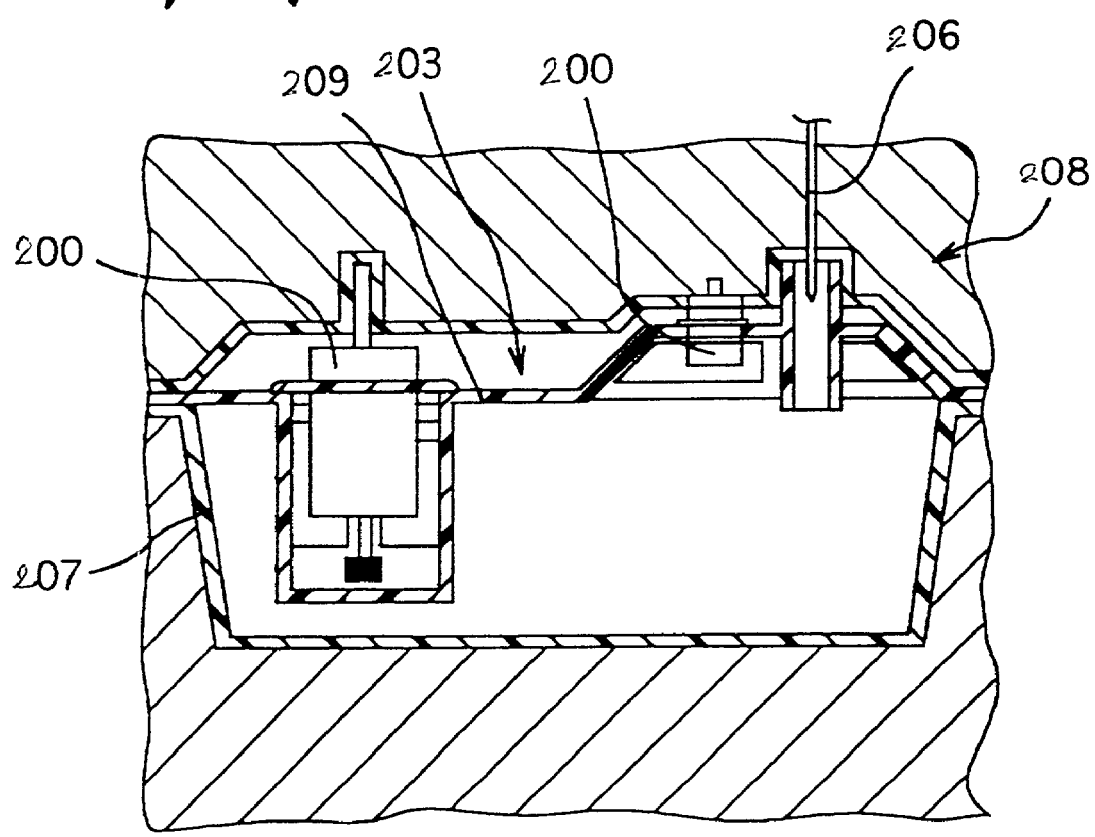
FIG. 19 is a sectional view of a conventional fuel tank.

FIGS. 17 and 18 show another modification of the invention illustrating a manufacturing steps of the tank body using a columnar module 160.

The columnar module 160 is provided with a first casing 161A, a second casing 161B and a fixing member 173. The fixing member 173 and the fist casing 161A, and the first casing 161A and the second casing 161B are connected to each other, through an upper elastic member 174A, and a lower elastic member 174B, respectively. The upper and lower elastic members 174A, 174B are provided, so that resilient force of the lower elastic member 174B is higher than that of the upper elastic member 174A.

As shown in FIG. 17, a fixing pin 175 is mounted on the columnar module 160 by inserted into openings formed in overlapping portions of the first and second casings 161A, 161B during the manufacturing steps of the fuel tank. Further a drawing string 176 which is extended outside the container mold 104 is connected to the fixing pin 175 so as to be pulling out of the tank body 110 after finishing the forming process of the tank body 110.

In a state where the fixing pin 175 is mounted, the first and second casings 161A, 161B are constrained in relative displacement against each other, storing elastic force in the lower elastic member 174B, and the elastic force of the lower elastic member 174B does not affect the other members.

The upper elastic member 174A is provided so that the fixing member 173 urges to the parison 30 when the side molds 400, 410 are closed in the module clamping step. The elastic force of the upper elastic member 174A is a magnitude so as to be unmovedly retained on its own position, but not so high that the parison 30 could be excessively deformed.

The subsequent tank body forming process may be performed substantially the same as the foregoing manner.

After cooling and solidifying the parison 30, namely, the tank body 110 are molded, the fixing pin 175 is detached from the columnar module 160 and recovered out of the tank body 110 by pulling off the drawing string 176. At this time, the constraint between the first and second casing 161A, 161B is released, thereby the elastic force of the lower elastic member 174B affects in the longitudinal direction of the columnar module 160. Here, since the elastic force of the lower elastic member 174B is provided higher than that of the upper elastic member 174A, the first casing 161A is displaced toward the upper inner surface 126 of the tank body 110 against the elastic force of the upper elastic member 171A. Then an abutment portion 177 formed on the top of the first casing 161A is brought into pressure contact to the upper inner surface 126.

By such the configuration, higher assembling reliability during the manufacturing processes as well as the higher clamping effect of the columnar method is achieved.

Although it is not illustrated in FIGS. 16 to 18, the functional components are integrally disposed in the columnar module similarly to the other embodiments.

The above modifications are basically applicable to embodiments illustrated as the first fuel tank. That is, the base body of the columnar module as support member may be provided as a partition having a plate shape.

According to the second fuel tank of the invention, it is possible to provide the fuel tank high in vertical rigidity. Also, according to the manufacturing method of the fuel tank of the invention, it is possible to provide the manufacturing method by which the fuel tank high in vertical rigidity can be easily manufactured.

What is claimed is:

1. A fuel tank comprising:
  a tank wall forming a tank body;
  a support member formed within said tank body, the support member including tank partitions disposed; and
  functional components which are integrally mounted with said support member inside said tank body;
  a coupling member disposed in said tank body and extending in a longitudinal direction of said tank, and wherein said coupling member couples said tank partitions to each other;
  wherein said support member is clamped in a vertical direction of the tank wall between upper and lower inner surfaces of the tank wall, and
  the tank wall is formed by blow molding of a resin, so that the tank partition is clamped between opposite inner surfaces of said tank wall in a direction substantially perpendicular to a longitudinal direction of said tank body.

2. The fuel tank according to claim 1, wherein an end portion of at least one of said tank partitions is inserted into a recess formed on said tank wall thereby to be clamped by said tank wall.

3. The fuel tank according to claim 1, further comprising a connecting unit which connects said functional component housed in said tank body to external through a connecting opening formed in said tank wall, said connecting unit including
  an external unit having a lid which is thermal-welded to said tank wall to thereby close up said connecting opening, and an outside pipe which penetrates said lid and is connected to external, and
  an internal unit having an inside pipe which is connected to said outside pipe, and an lifting mechanism which is attached to said support member and supports said inside pipe in a raiseable and lowerable manner.

4. The fuel tank according to claim 1, wherein said support member is a columnar module which is upstandingly disposed between upper and lower inner surfaces of said tank wall so as to enhance vertical rigidity of said fuel tank.

5. The fuel tank according to claim 4, wherein said columnar module is of cylindrical shape.

6. The fuel tank according to claim 1, wherein said support member has on at least one end thereof a slip-off prevention rib which is embedded in the inner surface of said tank wall to prevent said support member from slipping off from said inner surface of said tank wall.

7. The fuel tank according to claim 1, further comprising an extending tube in which wiring of said functional components is housed and which extends outside said tank body.

8. The fuel tank according to claim 1, further comprising an elastic member provided in said support member, wherein said elastic member urges the upper and lower inner surfaces of the tank wall in a vertical direction of said tank body through said support member.

9. A fuel tank comprising:
  a tank wall forming a tank body;
  a support member formed within said tank body; and
  functional components which are integrally mounted with said support member inside said tank body;
  wherein said support member is clamped in a vertical direction of the tank wall between upper and lower inner surfaces of the tank wall;
  a connecting unit which connects said functional component housed in said tank body to external through a connecting opening formed in said tank wall, said connecting unit including
  an external unit having a lid which is thermal-welded to said tank wall to thereby close up said connecting opening, and an outside pipe which penetrates said lid and is connected to external, and an internal unit having an inside pipe which is connected to said outside pipe, and a lifting mechanism which is attached to said support member and supports said inside pipe in a raiseable and lowerable manner.

10. The fuel tank according to claim 9, wherein the support member includes at least one tank partition disposed, and the tank wall is formed by blow molding of a resin, so that the tank partition is clamped between opposite inner surfaces of said tank wall in a direction substantially perpendicular to a longitudinal direction of said tank body.

11. The fuel tank according to claim 9, wherein said support member is a columnar module which is upstandingly disposed between upper and lower inner surfaces of said tank wall so as to enhance vertical rigidity of said fuel tank.

12. The fuel tank according to claim 11, wherein said columnar module is of cylindrical shape.

13. The fuel tank according to claim 9, wherein said support member has on at least one end thereof a slip-off prevention rib which is embedded in the inner surface of said tank wall to prevent said support member from slipping off from said inner surface of said tank wall.

14. The fuel tank according to claim 9, further comprising an extending tube in which wiring of said functional components is housed and which extends outside said tank body.

15. The fuel tank according to claim 9, further comprising an elastic member provided in said support member, wherein said elastic member urges the upper and lower inner surfaces of the tank wall in a vertical direction of said tank body through said support member.

16. A fuel tank comprising:

a tank wall forming a tank body;

a support member formed within said tank body, the support member being a columnar module which is upstandingly disposed between upper and lower inner surfaces of said tank wall so as to enhance vertical rigidity of said fuel tank; and functional components which are integrally mounted with said columnar module inside said tank body;

wherein said support member is clamped in a vertical direction of the tank wall between upper and lower inner surfaces of the tank wall.

17. The fuel tank according to claim 16, wherein the support member includes at least one tank partition disposed, and the tank wall is formed by blow molding of a resin, so that the tank partition is clamped between opposite inner surfaces of said tank wall in a direction substantially perpendicular to a longitudinal direction of said tank body.

18. The fuel tank according to claim 16, wherein said columnar module is of cylindrical shape.

19. The fuel tank according to claim 16, wherein said support member has on at least one end thereof a slip-off prevention rib which is embedded in the inner surface of said tank wall to prevent said support member from slipping off from said inner surface of said tank wall.

20. The fuel tank according to claim 16, further comprising an extending tube in which wiring of said functional components is housed and which extends outside said tank body.

21. The fuel tank according to claim 16, further comprising an elastic member provided in said support member, wherein said elastic member urges the upper and lower inner surfaces of the tank wall in a vertical direction of said tank body through said support member.

* * * * *